Aug. 9, 1949.   L. F. ASHFORD   2,478,448
METALLIC TRUCK BODY
Filed May 3, 1946   2 Sheets-Sheet 1
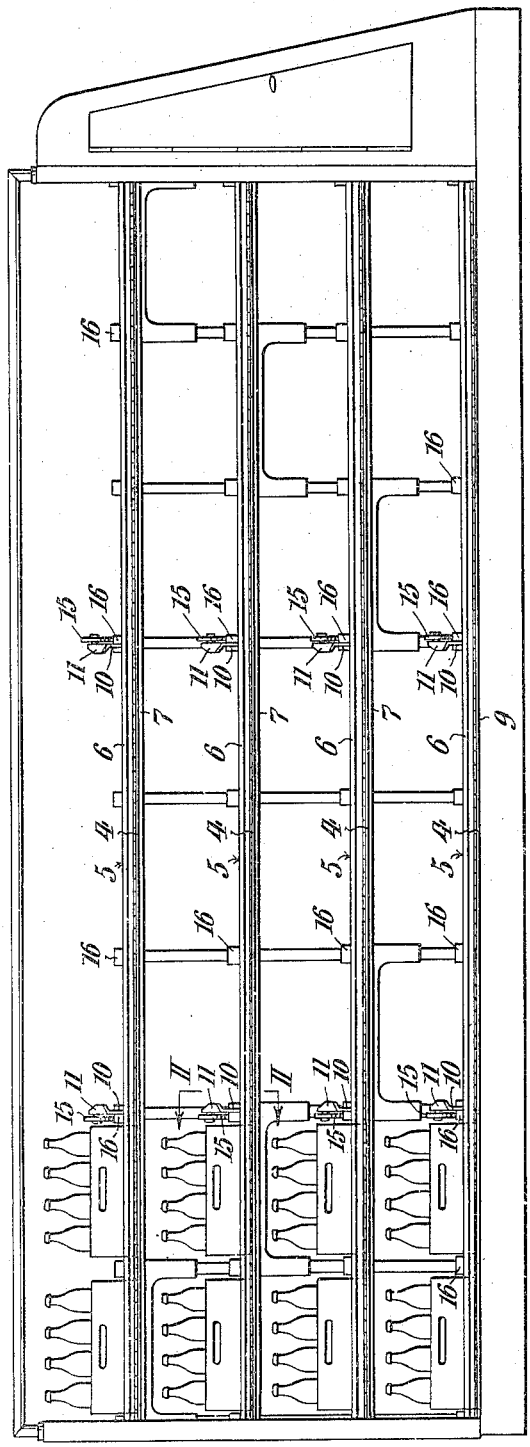
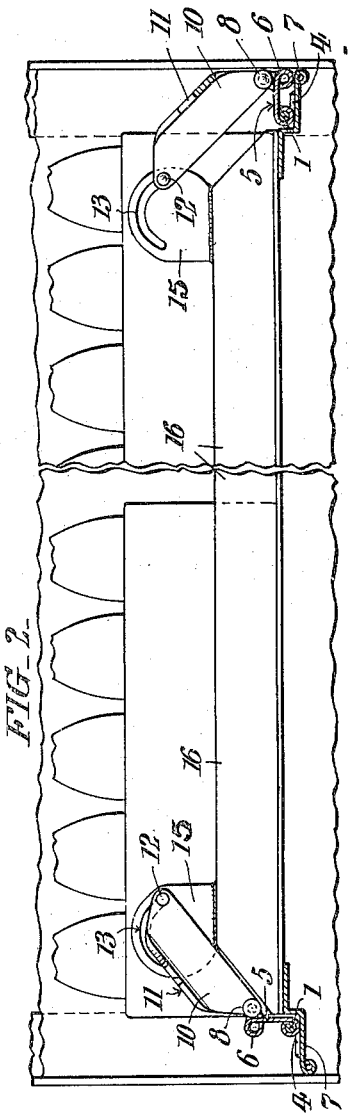
INVENTOR:
Leonard F. Ashford,
Paul & Paul
ATTORNEYS.

Aug. 9, 1949.                L. F. ASHFORD                2,478,448
                           METALLIC TRUCK BODY
Filed May 3, 1946                                    2 Sheets-Sheet 2
FIG_3_
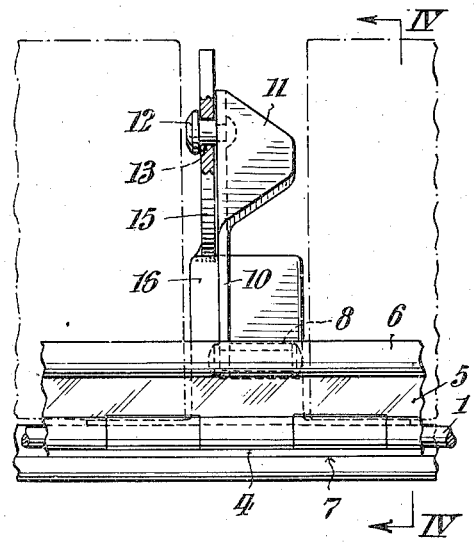
FIG_4_
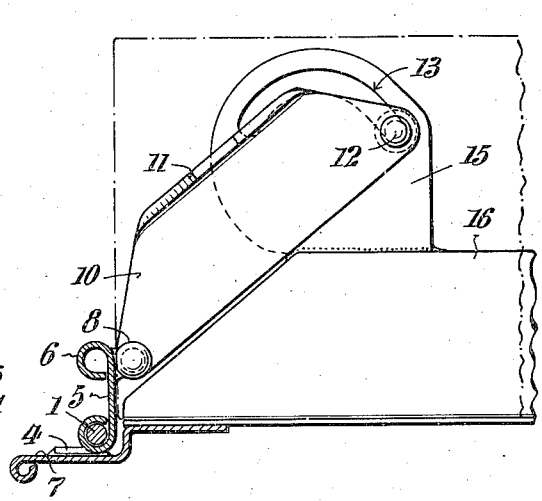
FIG_5_
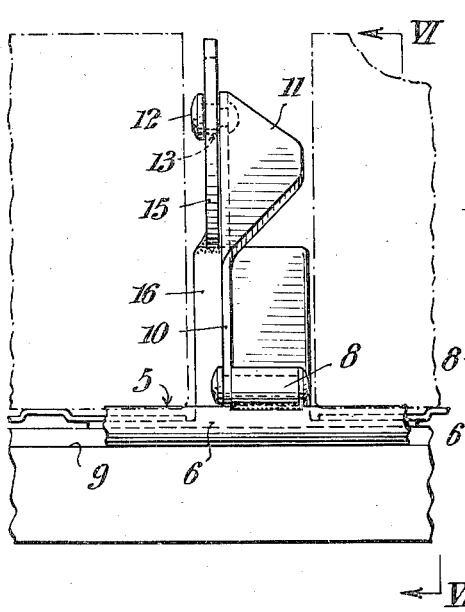
FIG_6_
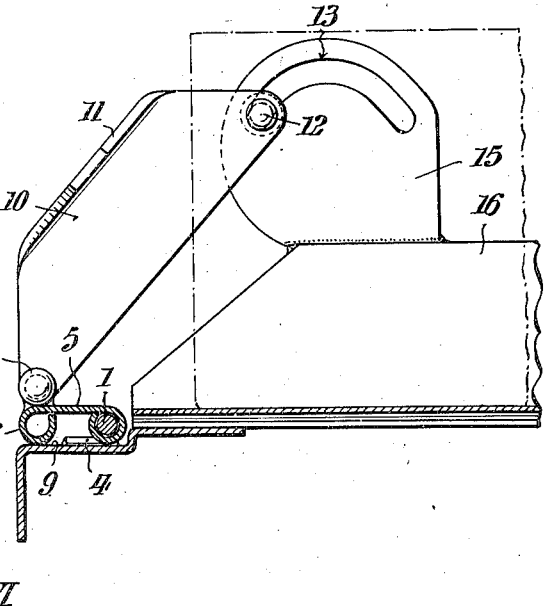
WITNESSES
Hubert Fuchs
Thomas W. Kerr, Jr.
INVENTOR:
Leonard F. Ashford,
BY Paul&Paul
ATTORNEYS.

Patented Aug. 9, 1949

2,478,448

UNITED STATES PATENT OFFICE 2,478,448

METALLIC TRUCK BODY

Leonard F. Ashford, Philadelphia, Pa., assignor to Specialty Engineering Company, Philadelphia, Pa., a corporation of Pennsylvania Application May 3, 1946, Serial No. 666,979

2 Claims. (Cl. 296—24)

My invention is applicable to truck bodies of the general type shown and described in U. S. Letters Patent 2,222,986, granted November 26, 1940, to George W. Parker, Jr. In these truck bodies boxes or similar articles are loaded and unloaded from the side of the truck. Usually the truck body is multi-decked and such loading and unloading is upon or from the floor of the truck as well as from all of the decks. A bead or strip is usually provided along the side of the floor at each deck to prevent the boxes from slipping out of the truck under lateral strains caused by the motion of the truck. Consequently to unload the box from the truck it is necessary to lift it over this bead or strip. My invention obviates the necessity of such lift by providing a movable resistance-strip which in one position affords no resistance to the loading or unloading of the box, but in another position effectively holds the boxes against slipping off under lateral strains.

I will illustrate and describe my invention as I have successfully applied it to a multi-deck metallic truck body of the type shown in Patent 2,222,986; but it may be applied to other kinds of truck bodies.

In the attached drawings, Fig. 1 is a side elevational view of the truck body, showing floor and three decks, with uprights supporting the decks.

Fig. 2 is a cross-sectional elevational view between the lines II—II, Fig. 1, but on an enlarged scale.

Figs. 3 and 4 are respectively an enlarged side elevation and a cross-sectional elevation of a part of the movable strip with its lifting and fixation means, the strip being in its upper or resistance position.

Figs. 5 and 6 are similar views with the strip in its lowered position.

The truck body of Figs. 1 and 2 is provided with flat movable-resistance strips or hinge members 5 running co-extensive with or from one end of the truck to the other. As best seen in Figs. 3–6 one leaf of each of the hinge members is mounted on a pintle-rod 1 similarly coextensive with the related side of the truck deck or floor, whereas the other leaf member serves as the resistance means. The lower and shorter leaf 4 of the hinge members lies flat on the edge piece 7 of the deck which is shown in Fig. 5 or on the skirt 9 of the down-stepped floor and is welded thereto. The wider and movable leaf or resistance member 5 is beaded as at 6, this bead having about the same diameter as that portion through which the pintle-rod 1 passes, so that the strip may lie horizontally on the edge piece 7 or skirt 9 as shown in Fig. 6 in which position it is coplanar with the truck floor and affords no resistance to sidewise removal of any or all of the boxes resting on the deck or floor. But by reason of the pintle-hinge the movable member or leaf 5 may be raised to an upright position as seen in Fig. 4 in which position it effectively bars the sliding of the boxes from the deck or floor when the truck body swings laterally, or when a box is otherwise pressed sidewise.

The mechanism for turning the strip 5 from its flat to its upright position and retaining it in that position as long as desired will now be described. At suitable intervals along its length the leaf 5 has lugs 8 fixed on its upper surface. Upon each lug is hinged a link-plate 10, the configuration of which is best seen in Figs. 3–6. This link-plate is doubly-hinged in that its motion in relation to the truck body is under the control of both the pintle-hinge and the lug-hinge. The top of each link plate is in part bent over to form a convenient grasp 11. A pin 12 projects horizontally from the upper part of the link plate and passes through a curved slot 13 formed in an upright plate 15, one of which is mounted at each end of the cross member 16 which passes from side to side of the truck.

The operation of my device is as follows:

When the truck is to be loaded the resistance strip 5 lies flat, as shown in Figs. 5 and 6, the pin 12 of the link plate resting at the outer end of the curved slot 13. When loaded, the operator with help of the grasps 11 lifts the pins over the curve of the slot, and permits them to fall to the other or inner end, by which means the resistance-strip is turned upright and effectively held in this position, retaining in place all of the boxes on the side of the deck or floor to which the strip corresponds. By reason of the curvature of the slot and the double hingeing of the link plate, this turning of the strip from the flat to the upright position and the carrying of the pin in the slot over the curved hump of the slot sinks the pins 12 into positions at the end of the slot whereby the strip is firmly held upright until this position is further changed by further manipulation of the link plates. While the strip is flat, one or all of the boxes of the deck with which it is associated may be removed, and while it is upright it accomplishes its intended purpose of preventing forcible removing of any of them.

Having thus described my invention, I claim:

1. In a multi-deck truck body for the transportation of boxes or similar articles; the combination of resistance means in the form of hinge members co-extensive with the truck; means securing one leaf of each said hinge member to a side edge of the truck floor; and double-hinged means operatively coordinating the other leaf of each hinge member to a stationary member on the truck floor for restricting movement of said last mentioned leaf from the horizontal to the vertical or resistance position, and vice versa, with capacity to rest only in either of such positions.

2. The structure of claim 1 wherein the truck floor is provided with downwardly stepped side portions to which one leaf of the respective resistance members is secured along one longitudinal edge, for co-planar location relative to the truck floor when loading or unloading the truck; wherein the leaves of said resistance members are of different size; wherein link members pivotally connect the outer edge of the relatively movable or larger hinge leaf of the respective resistance-members to a stationary element on the truck floor; and wherein each link member includes a projecting pin engaged in a curved slot of the related stationary element, whereby movement of the movable resistance-member is restricted to motion between the horizontal and vertical with capacity to rest only in one or the other of such positions.

LEONARD F. ASHFORD.

REFERENCES CITED

The following references are of record in the file of this patent:

UNITED STATES PATENTS

| Number | Name | Date |
|---|---|---|
| 411,578 | Burr | Sept. 24, 1889 |
| 748,246 | Williams | Dec. 29, 1903 |
| 953,509 | Bird | Mar. 29, 1910 |
| 1,028,515 | Whitney | June 4, 1912 |
| 1,985,739 | Murray | Dec. 25, 1934 |
| 2,230,635 | Alderfer | Feb. 4, 1941 |